United States Patent
Clausen et al.

(10) Patent No.: US 11,270,270 B2
(45) Date of Patent: Mar. 8, 2022

(54) TRUSTED SECURE ELECTRONIC PAYMENT PROCESSING PLATFORM

(71) Applicant: Deluxe Corporation, Shoreview, MN (US)

(72) Inventors: Christopher Wade Clausen, Andover, MN (US); Kurt Andrew Mangold, Rochester, NY (US)

(73) Assignee: Deluxe Corporation, Shoreview, MN (US)

( * ) Notice: Subject to any disclaimer, the term of this patent is extended or adjusted under 35 U.S.C. 154(b) by 116 days.

(21) Appl. No.: 16/593,569

(22) Filed: Oct. 4, 2019

(65) Prior Publication Data

US 2020/0111063 A1    Apr. 9, 2020

Related U.S. Application Data

(60) Provisional application No. 62/742,047, filed on Oct. 5, 2018.

(51) Int. Cl.
*G06Q 20/04* (2012.01)
*G06Q 20/38* (2012.01)
(Continued)

(52) U.S. Cl.
CPC ....... *G06Q 20/0425* (2013.01); *G06Q 20/382* (2013.01); *G06Q 20/405* (2013.01); *G06Q 20/4016* (2013.01); *G06Q 20/42* (2013.01)

(58) Field of Classification Search
CPC ........ G06Q 20/04; G06Q 20/38; G06Q 20/42; G06Q 20/0425; G06Q 20/382; G06Q 20/4016; G06Q 20/405; G06Q 20/40
(Continued)

(56) References Cited

U.S. PATENT DOCUMENTS

| H524 H | * | 9/1988 | Weideman | 345/601 |
| 5,930,778 A | * | 7/1999 | Geer | G06Q 40/02 705/45 |

(Continued)

FOREIGN PATENT DOCUMENTS

WO    2009045998    4/2009

OTHER PUBLICATIONS

"International Application Serial No. PCT US2019 054791, International Search Report dated Dec. 17, 2019", 5 pgs.

(Continued)

*Primary Examiner* — Narayanswamy Subramanian
*Assistant Examiner* — Ayal I. Sharon
(74) *Attorney, Agent, or Firm* — Stinson LLP

(57) ABSTRACT

The present subject matter involves a system and method for producing and processing electronic transactions, including electronic checks, in a secure manner. Enrollment information is received from a payor, and a secure portal is provided to authenticate electronic payment instructions from the payor. When instructions for a payment are received via the portal, risk for the payment is assessed. If funding for the payment is positively assessed, the present subject matter composites a front and back image of the check and performs an endorsement of the check. Electronic images are obtained of front and back of the printed check, and check image pairs are created of the electronic images of the front and back of the printed check. Select data on the check image pairs is anonymized, and an electronic deposit is performed in the amount of the payment to at least one payee.

19 Claims, 8 Drawing Sheets

(51) Int. Cl.
  *G06Q 20/40* (2012.01)
  *G06Q 20/42* (2012.01)
(58) Field of Classification Search
  USPC .......................................................... 705/45
  See application file for complete search history.

(56) References Cited

U.S. PATENT DOCUMENTS

| | | | | |
|---|---|---|---|---|
| 7,792,753 | B1* | 9/2010 | Slater | G06Q 20/042 |
| | | | | 705/45 |
| 7,885,451 | B1* | 2/2011 | Walls | G06Q 20/042 |
| | | | | 382/137 |
| 8,131,636 | B1* | 3/2012 | Viera | G06Q 20/4016 |
| | | | | 705/38 |
| 8,626,661 | B2* | 1/2014 | Gilder | G06Q 20/40 |
| | | | | 705/44 |
| 9,852,406 | B2* | 12/2017 | Doyle | G06Q 40/00 |
| 2004/0199462 | A1* | 10/2004 | Starrs | G06Q 30/02 |
| | | | | 705/39 |
| 2005/0097046 | A1* | 5/2005 | Singfield | G07F 19/202 |
| | | | | 705/42 |
| 2005/0144131 | A1 | 6/2005 | Aziz | |
| 2006/0202012 | A1* | 9/2006 | Grano | G06Q 20/26 |
| | | | | 235/379 |
| 2007/0288380 | A1* | 12/2007 | Starrs | G06Q 20/403 |
| | | | | 705/45 |
| 2008/0086420 | A1* | 4/2008 | Gilder | G06Q 20/10 |
| | | | | 705/44 |
| 2008/0247629 | A1 | 10/2008 | Gilder et al. | |
| 2008/0249951 | A1* | 10/2008 | Gilder | G06Q 20/04 |
| | | | | 705/76 |
| 2008/0306839 | A1* | 12/2008 | Starrs | G06Q 30/0641 |
| | | | | 705/27.1 |
| 2010/0161466 | A1* | 6/2010 | Gilder | G06Q 20/04 |
| | | | | 705/34 |
| 2010/0198733 | A1* | 8/2010 | Gantman | G06Q 20/3821 |
| | | | | 705/75 |
| 2010/0205090 | A1* | 8/2010 | Fellerman | G06Q 20/04 |
| | | | | 705/40 |
| 2012/0130899 | A1* | 5/2012 | McMonagle | G06Q 40/00 |
| | | | | 705/45 |
| 2013/0212008 | A1* | 8/2013 | Edwards | G06Q 20/10 |
| | | | | 705/39 |
| 2013/0282590 | A1* | 10/2013 | Rajarethnam | G06Q 20/3276 |
| | | | | 705/71 |
| 2014/0052621 | A1* | 2/2014 | Love | G06Q 20/34 |
| | | | | 705/39 |
| 2014/0195416 | A1* | 7/2014 | Linscott | G06Q 20/102 |
| | | | | 705/39 |
| 2015/0088740 | A1* | 3/2015 | Doyle | G06Q 20/108 |
| | | | | 705/42 |
| 2015/0127527 | A1 | 5/2015 | Eide | |
| 2015/0278793 | A1* | 10/2015 | Roberts | G06Q 20/22 |
| | | | | 705/45 |
| 2017/0061438 | A1 | 3/2017 | Patel | |
| 2018/0240081 | A1* | 8/2018 | Doyle | G06Q 20/02 |
| 2019/0080322 | A1* | 3/2019 | Elischer | G06Q 20/042 |

OTHER PUBLICATIONS

"International Application Serial No. PCT US2019 054791, Written Opinion dated Dec. 17, 2019", 6 pgs.

* cited by examiner

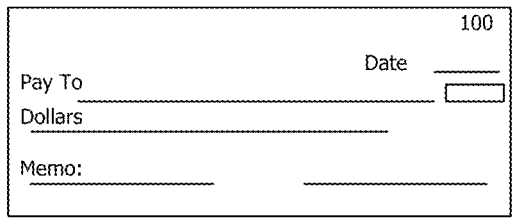
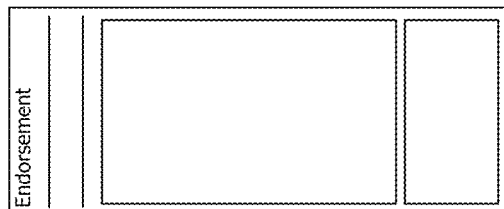
FIG. 1A  FIG. 1B
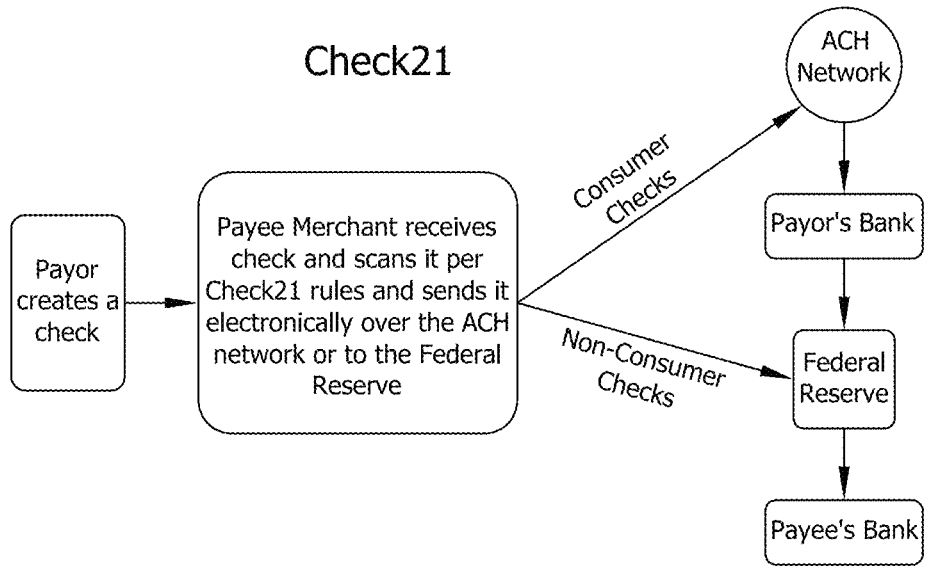
FIG. 2

FIG. 6B

TRUSTED SECURE ELECTRONIC PAYMENT PROCESSING PLATFORM

CLAIM OF PRIORITY AND INCORPORATION BY REFERENCE

The present application claims the benefit under 35 U.S.C. § 119(e) of U.S. Provisional Patent Application 62/742,047, filed Oct. 5, 2018, the disclosure of which is hereby incorporated by reference herein in its entirety.

TECHNICAL FIELD

This application relates generally to electronic financial transaction processing, and more particularly to the secure processing of electronic negotiable instruments.

BACKGROUND

A monetary transaction typically involves a payor providing funds to a payee for goods or services rendered. One common way for a payor to provide funds to a payee is in the form of a negotiable instrument, such as a check. A check is a negotiable instrument drawn against payor's financial institution which includes the financial institution's bank routing number, payor's account number, payment amount, payee's name, date, and payor's endorsement. The payee can cash the check at a bank or other financial institution, deposit the check into the payee's account, or endorse it for payment to the order of another person or legal entity. The bank uses the information provided on the check to determine the amount of the check, a bank and account where the funds are located, and sometimes the payee account in which to deposit the funds.

This system of transferring funds between a payor and a payee using a physical document, such as a check, presents several challenges. First, the check is susceptible to fraud. The physical document can be tampered with to change the amount and the payee to whom funds should be remitted. Another form of fraud occurs when a check back is presented which does not match the paper check, for example to fraudulently direct payments to a fraudulent recipient. In addition, based on visual inspection of the check alone there is no way for the payee to determine whether or not the account the check is drawing funds from has sufficient funds.

It is not always convenient for a payee to travel to an appropriate financial institution to deposit the check, and this delay by the payee could lead to the check becoming lost or a decrease in the amount of funds available in the account to cover the amount written on the check in the interim.

In addition, the check clearing system based on the exchange of physical documents can be costly and add time delays to the check clearing process due to transportation and processing of large volumes of physical documents. In the United States of America, prior to 2004 if a payee deposited a check written by a payor from one bank into an account at a different bank, the banks would have to physically exchange the paper check before the money would be credited to the account. In 2004 the Check Clearing for the 21st Century Act (Check21 Act) was passed in the United States which makes the digital image of a check (electronic check or eCheck) legally acceptable for payment purposes in the same manner as a traditional paper check. Under the Check21 Act, rather than exchanging paper checks between banks when a payee deposits a check, one bank can simply send an image of the check to the other bank.

Remote deposit capture (RDC) is a system by which payees can take advantage of the Check21 Act to deposit a check into a bank account from a remote location without having to physically deliver the check to the bank. RDC involves the payee taking a digital image of a check and transmitting that image to a bank for deposit. RDC is different than systems such as direct deposit, where an employee's earnings are posted directly to his or her bank account, or online deposit in which a retail banking service allows an authorized payee to record a check for deposit and have it posted to the payee's account prior to mailing in the physical check to the bank, giving the payee access to the funds before the check has been cleared by the bank.

Some currently available systems for processing eChecks use banks to authenticate and guarantee payment by transmitting payor account and routing information on digital images of eChecks. This transmission of information is susceptible to intercept and consequential fraud.

Thus, there is a need in the art for a trusted electronic payment platform to process electronic deposits, including electronic checks, in a secure manner. There is further a need in the art for a trusted platform for authenticating and guaranteeing payments of individual electronic payments.

SUMMARY

The present subject matter involves a system and method for producing and processing electronic payments including electronic checks in a secure manner. In various embodiments, enrollment information is received from a payor, including authorization to process electronic payments or deposits to select payees. A secure portal is provided to authenticate electronic payment instructions from the payor, in various embodiments. In various embodiments, electronic payment instructions are received including payment data from the payor via the secure portal, the payment data including an amount of a payment and identifying at least one payee of the select payees. Funding for the payment is assessed and guaranteed based on underwriting requirements and risk assessment of past payments by the payor, in various embodiments. If funding for the payment is positively assessed, the present subject matter composites a front image of the check from the received payment data, performs an endorsement of the check as an authorized agent if the endorsement is required, and composites a back image of the check based on an indicated bank of first deposit. In various embodiments, the check is printed including the front image and the back image to fulfill Check21 Act requirements, electronic images are obtained of front and back of the printed check, and check image pairs are created of the electronic images of the front and back of the printed check. According to various embodiments, select data on the check image pairs is anonymized, including deleting at least a portion of an account number or a routing number of the payor. In various embodiments, an electronic deposit is performed in the amount of the payment to the at least one payee using a banking partner, and the anonymized check image pairs are sent to the payee.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF DRAWINGS

FIG. 1A is a front image of a conventional check.
FIG. 1B is a back image of a conventional check.

FIG. 2 is a flow diagram illustrating process steps for electronic check payments under the Check21 Act.

FIGS. 6A and 6B illustrate an example of a check preview screen of a user interface according to one embodiment of the present subject matter.

DETAILED DESCRIPTION

Figure 3:
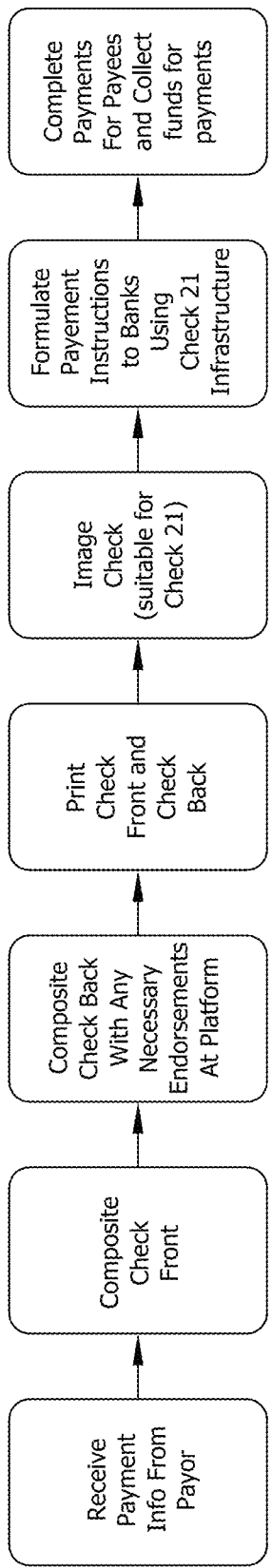
FIG. 3 is a flow diagram illustrating process steps for a trusted electronic payment processing platform according to various embodiments of the present subject matter.

The following detailed description refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Currently available systems for processing electronic checks use banks to authenticate and guarantee payment by transmitting payor account and routing information on digital images of the checks. This transmission of information is susceptible to intercept and consequential fraud.

The present subject matter provides a trusted secure electronic payment platform capable of processing electronic checks in a secure manner, including authenticating and guaranteeing payment of electronic checks without endorsement of individual instruments.

FIG. 1A is a front image of a conventional check. The check front includes a check number (e.g., "100"), a Date field, a Pay To field, a check amount ("Dollars") field in both text and numerals, a memo field, and a space for a payor endorsement (signature line).

FIG. 1B is a back image of the conventional check of FIG. 1A. It includes an Endorsement region and other areas which may be used by the depositor financial institution. One or more payee endorsements are typically found in this region.

Processing of conventional checks for deposit is typically done at brick and mortar banking institutions, remote automatic teller machine (ATM) devices, duplex scanning, flatbed scanning and most recently the camera systems of smart phone and tablet devices. The conversion to electronic form for mobile remote deposit using flatbed scanners and smart phones convert the physical check document into two separate images. The majority of check information is present on the front of a check (Side A). The payee's endorsement on the opposite side of the check is important to know at the point of deposit. Thus, conventional check image processes involve two images.

FIG. 2 is a flow diagram illustrating process steps for electronic check payments under the Check21 Act. In prior art systems, a payor creates a check and submits it to a merchant or financial institution. The recipient of the check scans it to meet the Check21 rules. If the transaction is a consumer check the scanned check images will be sent to the ACH (automated clearing house) network and if it relates to a non-consumer check (e.g., corporate, payroll checks, etc.) the scanned check images will be sent to the Federal Reserve. Consequently, the check funds will be withdrawn from the payor's account and the funds will be deposited in the payee's bank account.

FIG. 3 is a flow diagram illustrating process steps for a trusted electronic payment processing platform according to various embodiments of the present subject matter. In various embodiments, the electronic payment processing platform receives electronic payment information from a payor, who can be a customer of a service operating the platform and composites an image of a front side of an electronic check. In various embodiments, the composited image is accessible to the payor only if the transaction does not involve parameters associated with fraudulent transactions (e.g., a suspicious payee, an unusually large amount of payment, a transaction associated with fraudulent transactions, etc.) to avoid sending a potentially fraudulent check image to the user. In various embodiments, the composited image is made available to the payor to approve the transaction. In various embodiments an application executing on the payor's device receives and displays the image. The image can be reviewed by the payor and approved to instruct the trusted secure electronic payment platform to complete the electronic payment.

In various embodiments the payor is logged into the payment platform using a client device, such as a desktop computer, a mobile phone, a laptop computer, or other computing device. In various embodiments the client executes a browser-based program or API interface to communicate with the payment platform. In various embodiments, the client executes an applet or other software to communicate with the payment platform. One advantage of some embodiments of the present system is its ability to control which images are presented to the user to avoid enabling a fraudulent user from generating a check image that could be used to conduct a fraudulent transaction.

According to various embodiments, a back side of check is composited using the platform. In various embodiments of the present system, the payee authorizes the operator of the payment platform to electronically endorse the back side of check to perform the electronic transaction. In various embodiments of the present system, the payee has pre-authorized the operator of the payment platform to electronically endorse the back side of check to a payee to perform the electronic transaction. One of the advantages of such embodiments of the present subject matter is that they allow the payment platform to generate the back side of the check with various financial partners to perform the electronic transaction. In various embodiments the payment platform can endorse payment to a bank or other financial institution within a network that can perform the electronic transaction, without disclosing the payor's financial institution and account information.

Figure 6A:
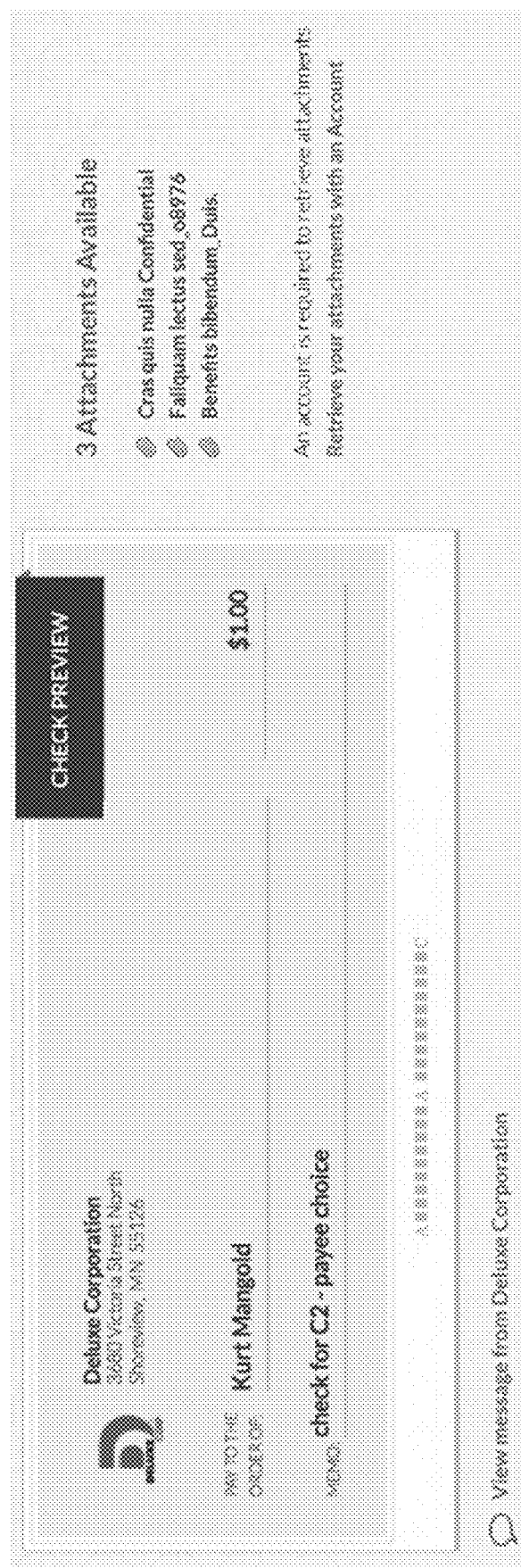
Figure 6B:
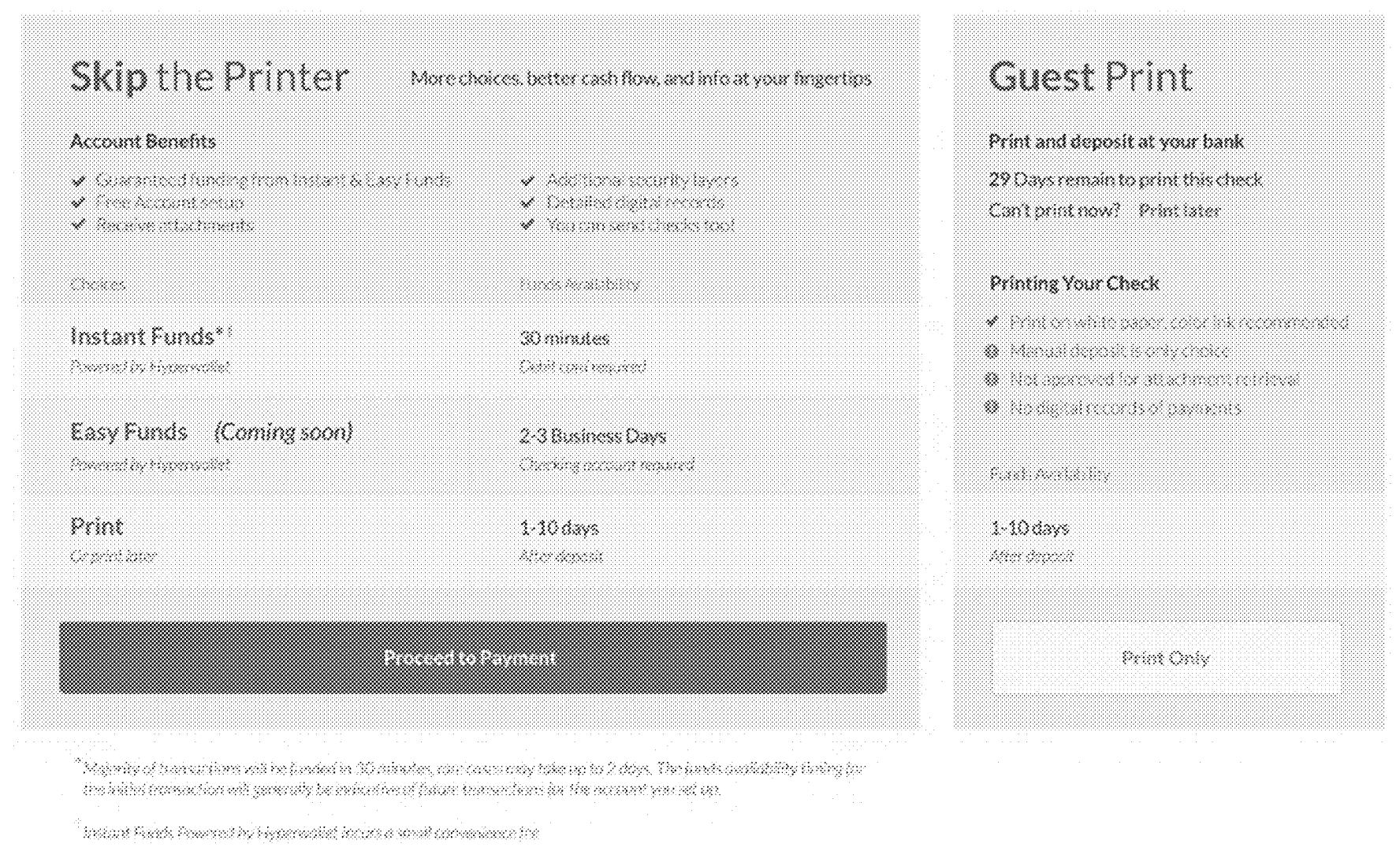

In various embodiments, the front and back side of the check are printed using the platform to provide a paper check, which can be used to document an electronic transfer and which can be scanned and presented using the Check 21 process. In such embodiments, the payor can provide payee and an amount of the payment to the secure payment platform. The secure payment platform can composite front and back sides of a check that can be remitted for payment using the Check 21 infrastructure in cooperation with its financial institution partners to provide payment to the payee. FIGS. 6A and 6B illustrate an example of a check preview of a check front in a user interface with certain accounting and routing information redacted according to one embodiment of the present subject matter. The system allows the payor to order a payment or print a check to make the payment.

In various embodiments, a printed check is imaged (such as by scanning) using the platform in a format suitable for Check 21 processing. In various embodiments, the electronic payment processing platform formulates payment instructions to banks (or other financial institutions) using the Check 21 infrastructure, and completes payments and collects funds for payments.

Figure 4:
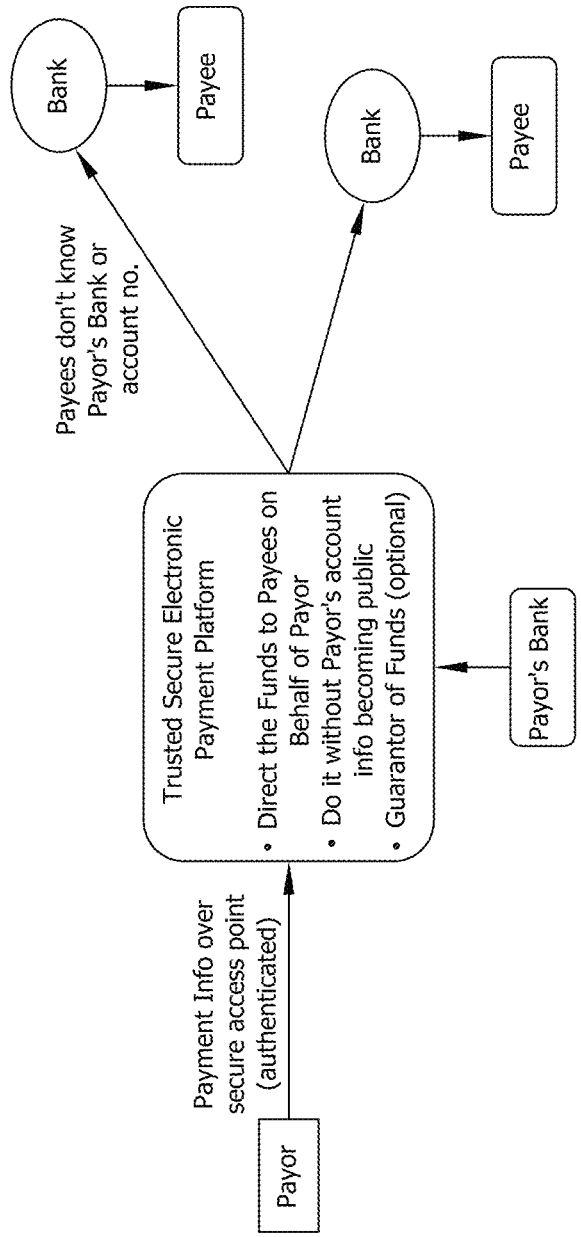
FIG. 4 is a block diagram of a system for a trusted electronic payment processing platform according to various embodiments of the present subject matter.

FIG. 4 is a block diagram of a system for a trusted, secure electronic payment processing platform according to various embodiments of the present subject matter. In various embodiments, the platform receives authenticated payment information over a secure access point from a payor. In various embodiments, the platform is configured to have the electronic transaction specified by the payor assessed by an underwriter to mitigate risk of loss over a plurality of transactions. In such embodiments, the platform can communicate over a secure connection with a guarantor to determine if the transaction can be conducted using guaranteed funds. If a transaction is guaranteed the processing platform can perform payments with less concern about the validity of each electronic transaction. The guarantee determination can also be used as a means to determine if a composited check will be presented to a payor/user. In cases where the risk exceeds a limit that the guarantor will accept, another risk mitigation approach is to prevent a composited check image from being presented to the payee/user. In various embodiments the image may be presented to the payor/user for consideration and approval by the payor.

In embodiments where the payor has authorized the trusted secure electronic payment platform to control payments, it can composite an eCheck back side with endorsements to financial partners as needed to perform the financial transaction. In such applications, the system directs the funds to payees on behalf of payors, without having the payor's account information become known to the payee or at risk for public disclosure.

According to various embodiments, the payor registers with the trusted electronic payment processing platform, and authorizes the trusted electronic payment processing platform to process electronic payments and/or deposits on behalf of the payor to select payees. The payor sends electronic transaction data, such as is found on check front, using a graphic user interface (GUI) to the trusted electronic payment processing platform. In various embodiments, the transmission is sent without sending an image of a check. A virtual private network (VPN) is used to transmit account related information, in various embodiments. In various embodiments, the information includes an amount of payment and payee or payee's account. In various embodiments, the funding source for the payment is a default source. In various embodiments, the funding source is designated and provided with the other information. In various embodiments, the trusted secure electronic payment system is configured to receive the electronic payment information and generate a Check 21 compliant eCheck for payment of the payor. Funds are remitted using the guarantor to underwrite the transactions, and using partner financial institutions that provide the payment and assist in fund settlement to ensure that all of the partner financial institutions are reimbursed for any deposits made to a payee or other financial institution.

In various embodiments, the trusted electronic payment platform provides an electronic check processing system that enrolls payor/customers and records the payor/customer's frequently-used payees' accounts. The trusted electronic payment platform provides a secure portal to authenticate electronic payment instructions from the payor/customer. In various embodiments, the trusted electronic payment processing platform will assess and guarantee the funding transfer if it meets underwriting requirements, using an algorithm running to assess risk based on past payments. If the assessment indicates that the proposed payment is a high risk transaction, the trusted electronic payment processing platform will revert to the standard negotiation and settlement method currently employed today where the payee prints the check as the payor's agent and then presents the check to the bank in a traditional manner for negotiation and settlement. If the assessment indicates that the proposed payment does meet underwriting requirements, the trusted electronic payment processing platform will composite the eCheck front image from the payor data. Depending on the bank of first deposit, the trusted electronic payment processing platform will composite the back image of the eCheck, in various embodiments.

If endorsement is necessary, the trusted electronic payment processing platform obtains the proper authorizations from the payee to be an authorized agent to perform that endorsement, in various embodiments. The trusted electronic payment processing platform may accordingly create an image of the back of the check, and print the check to fulfill Check21 Act requirements and thereby create a "live" check, in various embodiments. The trusted electronic payment processing platform will scan and image the front and back of the check, create check image pairs of front and back, and anonymize select data (e.g., payee does not see bank account routing number and/or account number of payor), in various embodiments. According to various embodiments, the trusted electronic payment processing platform will then perform the eDeposit with a banking partner, completing the payment transaction. One advantage of this approach is that the front and back of the electronic check are electronically paired by the system, so the system avoids fraudulent practices where check front and back sides are altered or exchanged to commit fraud. Compositing, generation, and association of the back side of the check is a security feature that allows the trusted agent to create a reliable electronic check. Authorization of the trusted agent benefits the payor and payee by avoiding extra delay and extra communications to obtain authorization to endorse the check to member payors. These features streamline the processing of electronic payments using electronic checks and existing infrastructure for processing them, without the attendant risk of fraud and failure modes of a conventional check processing system. These features, further coupled with a guarantor function, enhance the speed and reliability of electronic payments using electronic checks and existing infrastructure for processing them, because they use the guarantor's knowledge base to perform risk analysis and mitigation for better transactions and the trusted agent can provide these transactions without the attendant risk of fraud and failure modes of a conventional check processing system.

In various embodiments, the trusted electronic payment platform is configured to use a server to enroll payors and payees and to collect and record their preferences and authorizations. Payors can be provided a secure access to a database of payees and can request that certain payees are added to the system. The operator of the trusted electronic payment platform has storage and secure database features that can assist in the enrollment of new payees, record their payment preferences, and obtain the necessary agreements to deposit electronic payments according to those preferences. Payees can authorize the trusted electronic processing platform to endorse payments from the payor as the payee has elected, thereby allowing the trusted electronic payment platform to create images of a front and back electronic check for further processing as set forth in this application.

Figure 7:
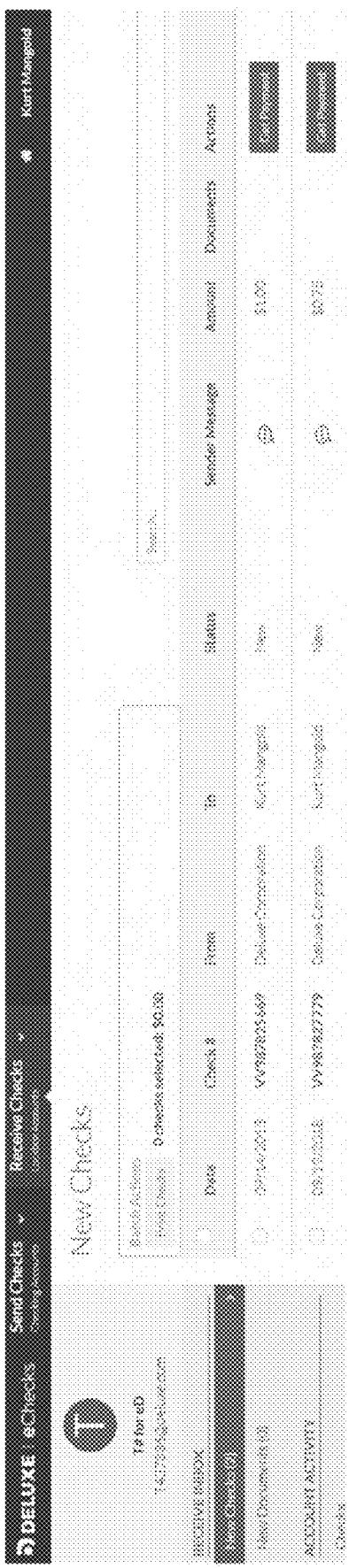
FIG. 7 is an example of an account inbox of a user interface according to one embodiment of the present subject matter.

FIG. 7 is an example of an account inbox of a user interface according to one embodiment of the present subject matter. The account inbox provides the payee information about the electronic transactions in the form of received electronic checks and allows a payee to obtain payment.

Figure 8:
FIG. 8 is an example of a payment options page of a user interface according to one embodiment of the present subject matter.

FIG. 8 is an example of a payment options page of a user interface according to one embodiment of the present subject matter. In various embodiments, the system allows the payee to print a check, transfer funds into an account, or get instant funds. Other transactions options are possible without departing from the present subject matter.

Figure 9:
FIG. 9 is an example of a check history page of a user interface according to one embodiment of the present subject matter.

FIG. 9 is an example of a check history page of a user interface according to one embodiment of the present subject matter. In various embodiments, the check history page provides an image of the eCheck and a funding option selected by the payee.

The present subject matter includes various advantages for various embodiments, including one or combinations of the following advantages. One of the advantages of the use of a trusted electronic payment processing platform is that it can authenticate payors to prevent fraud. Another advantage of various embodiments of the present subject matter is that the trusted processing platform can assess requested payment and deposit transactions to guarantee funds, which also prevents fraud. Another advantage of the present subject matter is that the trusted processing platform may use the Check21 infrastructure to pay payees. Another advantage is that the trusted processing platform may employ blanket-authorizations from the payors to make payments on behalf of payors directly, without each step of a transaction being endorsed by the payor. Another advantage of the present subject matter is confidentiality of payor bank information, such that the payee is not aware of payor's bank, account number or routing number. Other advantages exist which are not described herein.

Figure 5:
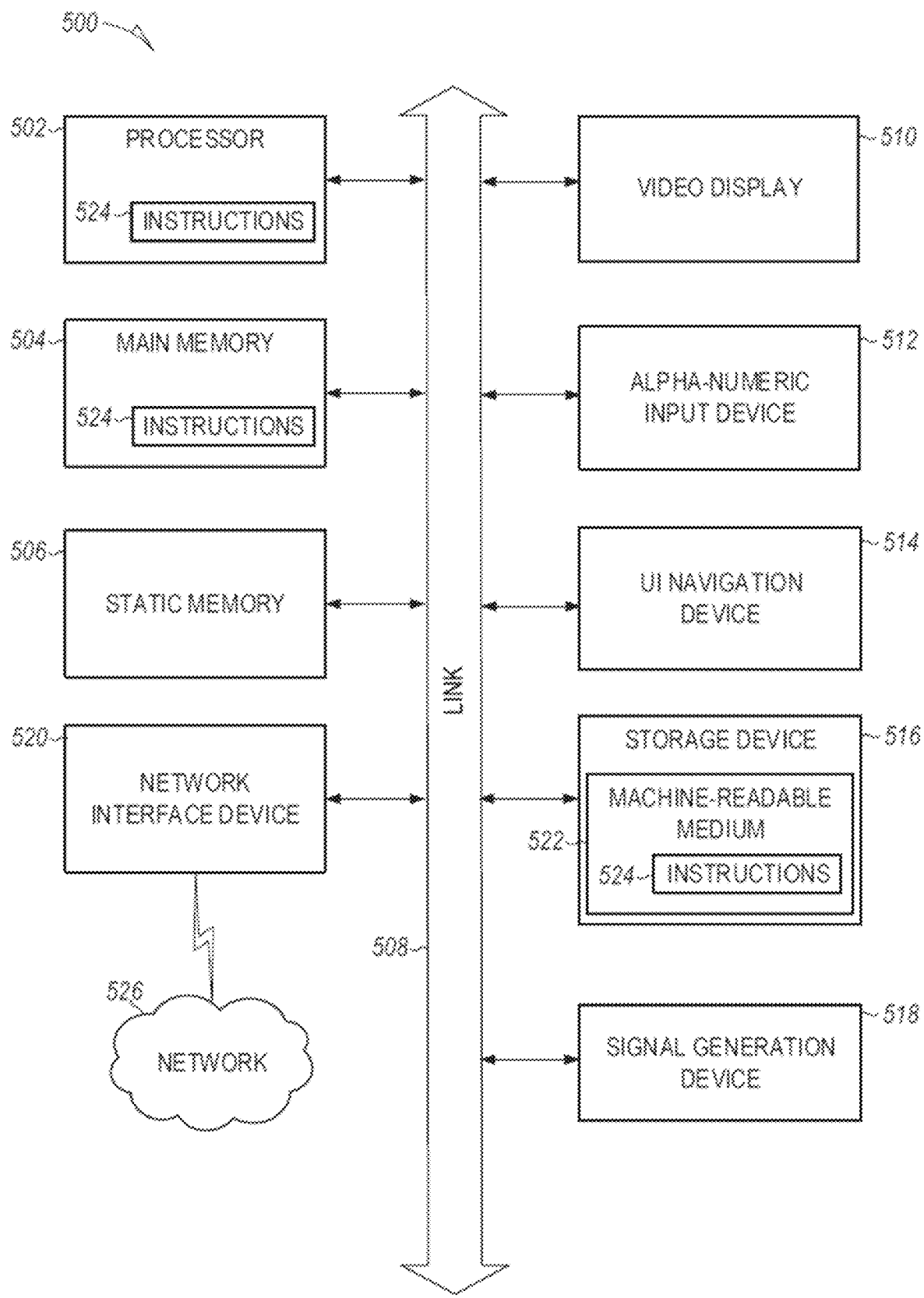
FIG. 5 is a block diagram of a machine in the example form of a computer system within which a set of instructions can be executed, for causing the machine to perform any one or more of the methodologies discussed herein.

FIG. 5 is a block diagram illustrating a machine in the example form of a computer system 500, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile or cellular telephone such as a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 can additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The data storage device 516 includes a machine-readable medium 522 on which is stored one or more sets of data structures and instructions 524 (e.g., software) embodying or utilized by any one or more of the methodologies or functions described herein. The instructions 524 may include a machine learning system or algorithm, and can also reside, completely or at least partially, within the main memory 504, static memory 506, and/or within the processor 502 during execution thereof by the computer system 500, with the main memory 504, static memory 506, and the processor 502 also constituting machine-readable media.

While the non-transitory computer-readable storage medium 522 is illustrated in an example embodiment to be a single medium, the term "machine-readable medium" or "computer-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions (e.g., instructions 524) for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone system (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

An example (e.g. "Example 1") of a method for processing an electronic payment requested by a payor may include providing a secure server to authenticate electronic payment information received from an apparatus configured to be used by the payor, receiving enrollment information relating to the payor, receiving electronic payment instructions including payment data specified by the payor via the secure server, the payment data including an amount of a payment and identifying at least one payee, and assessing a risk of the electronic payment instructions. If the risk is determined to be within an acceptable level, the method may further include: compositing a front image of a check from the received payment data; performing an endorsement of the check if required; compositing a back image of the check including the endorsement; printing the check including the front image and the back image; scanning electronic images of front and back of the printed check; creating check image pairs of the electronic images of the front and back of the printed check; protecting data on the check image pairs; and ordering an electronic deposit in the amount of the payment to the at least one payee using a financial institution partner.

In Example 2, the subject matter of Example 1 may optionally be configured such that protecting data on the check image pairs includes protecting at least a portion of an account number of an account of the payor.

In Example 3, the subject matter of Example may optionally be configured such that protecting data on the check image pairs includes protecting at least a portion of a routing number of an account of the payor.

In Example 4, the subject matter of Example 1 may optionally be configured such that protecting data on the check image pairs includes protecting at least a portion of an account number of an account of the payor and protecting at least a portion of a routing number of the account of the payor.

In Example 5, the subject matter of Example 1 may optionally be configured such that protecting data on the check image pairs includes anonymizing data on the check image pairs.

In Example 6, the subject matter of Example 1 may optionally be configured such that protecting data on the check image pairs includes deleting data on the check image pairs.

In Example 7, the subject matter of Example 1 may optionally be configured such that the method further includes obtaining a guarantee of the payment based on underwriting requirements and risk assessment.

In Example 8, the subject matter of Example 1 may optionally be configured such that, if the risk is determined to exceed an acceptable level, code executing on the secure server prevents printing of a check.

In Example 9, the subject matter of Example 1 may optionally be configured such that, if the risk is determined to exceed an acceptable level, code executing on a remote application prevents printing of a check.

In Example 10, the subject matter of Example 1 may optionally be configured such that, if the risk is determined to exceed an acceptable level, code executing on the secure server and on a remote application prevents printing of a check.

In Example 11, the subject matter of Example 1 may optionally be configured such that receiving enrollment information relating to the payor includes receiving authorization to process electronic transactions.

In Example 12, the subject matter of Example 1 may optionally be configured such that receiving enrollment information relating to the payor includes receiving authorization to endorse payments to partner financial institutions.

An example (e.g. "Example 13") of a system for processing an electronic payment requested by a payor may include a secure server configured to authenticate electronic payment information received from the payor, the secure server including at least one processor configured to execute instructions to: receive enrollment information relating to the payor, including authorization to process electronic transactions and endorse payments to partner financial institutions; receive electronic payment instructions including payment data specified by the payor via the secure server, the payment data including an amount of a payment and identifying at least one payee; and assess a risk of the electronic payment instructions. If the risk is determined to be within an acceptable level, the at least one processor configured to execute instructions to: composite a front image of a check from the received payment data; perform an endorsement of the check if required; composite a back image of the check including the endorsement; print the check including the front image and the back image; scan electronic images of front and back of the printed check; create check image pairs of the electronic images of the front and back of the printed check; and protect data on the check image pairs, including protecting at least a portion of an account number, a routing number of an account of the payor, or both the account number and routing number; and order an electronic deposit in the amount of the payment to the at least one payee using a financial institution partner.

In Example 14, the subject matter of Example 13 may optionally be configured such that the secure server is configured to receive electronic payment information from a client device configured to be used by the payor.

In Example 15, the subject matter of Example 14 may optionally be configured such that the client device includes one or more of a desktop computer, a mobile phone, or a laptop computer.

In Example 16, the subject matter of Example 14 may optionally be configured such that the client device executes a browser-based program to communicate with the secure server.

In Example 17, the subject matter of Example 14 may optionally be configured such that the client device executes an applet to communicate with the secure server.

In Example 18, the subject matter of Example 13 may optionally be configured such that, to assess a risk of the electronic payment instructions, the secure server is configured to determine if the electronic payment instructions include parameters associated with fraudulent transactions.

In Example 19, the subject matter of Example 18 may optionally be configured such that the parameters associated with fraudulent transactions include a suspicious payee.

In Example 20, the subject matter of Example 18 may optionally be configured such that the parameters associated with fraudulent transactions include an unusually large amount of payment.

It is understood that other combinations and configurations may be employed without departing from the scope of the present subject matter. This application is intended to cover adaptations or variations of the present subject matter. It is to be understood that the above description is intended to be illustrative, and not restrictive. The scope of the present subject matter should be determined with reference to the appended claims, along with the full scope of equivalents to which such claims are entitled.

What is claimed is:

1. A method for processing an electronic payment requested by a payor, comprising:
   authenticating, by a secure server, electronic payment information received from a client device configured to be used by the payor, the secure server and the client device each coupled to a communications network, the client device configured to send the electronic payment information to the secure server on the communications network via a secure access point;
   receiving, by the secure server, enrollment information from the client device via the communications network, the enrollment information relating to the payor and including authorization to process the electronic payment to one or more partner financial institutions;
   receiving, by the secure server, electronic payment instructions from the client device via the communications network, the electronic payment instructions including payment data specified by the payor via the client device, the payment data including an amount of a payment and identifying at least one payee, the payment data further including a front image and a back image of a check acquired by the client device;
   executing, by the secure server, an algorithm stored on a machine-readable medium for assessing a risk of the electronic payment instructions based on past payments; and
   if the risk is determined to be within an acceptable level:
   compositing the front image of a check from the received payment data;
   performing an endorsement of the check if required;
   compositing the back image of the check including the endorsement;
   printing the check including the front image and the back image;
   scanning electronic images of front and back of the printed check;
   creating check image pairs of the electronic images of the front and back of the printed check;
   altering the check image pairs to protect data on the check image pairs; and
   ordering an electronic deposit in the amount of the payment to the at least one payee using a selected partner financial institution.

2. The method of claim 1, wherein altering the check image pairs to protect data on the check image pairs includes protecting at least a portion of an account number of an account of the payor.

3. The method of claim 1, wherein altering the check image pairs to protect data on the check image pairs includes protecting at least a portion of a routing number of an account of the payor.

4. The method of claim 1, wherein altering the check image pairs to protect data on the check image pairs includes protecting at least a portion of an account number of an account of the payor and protecting at least a portion of a routing number of the account of the payor.

5. The method of claim 1, wherein altering the check image pairs to protect data on the check image pairs includes anonymizing data on the check image pairs.

6. The method of claim 1, wherein altering the check image pairs to protect data on the check image pairs includes deleting data on the check image pairs.

7. The method of claim 1, further comprising obtaining a guarantee of the payment based on underwriting requirements and risk assessment.

8. The method of claim 1, wherein if the risk is determined to exceed an acceptable level, code executing on the secure server prevents printing of a check.

9. The method of claim 1, wherein if the risk is determined to exceed an acceptable level, code executing on a remote application prevents printing of a check.

10. The method of claim 1, wherein if the risk is determined to exceed an acceptable level, code executing on the secure server and on a remote application prevents printing of a check.

11. The method of claim 1, wherein receiving enrollment information relating to the payor includes receiving authorization to process electronic transactions.

12. The method of claim 1, wherein receiving enrollment information relating to the payor includes receiving authorization to endorse payments to partner financial institutions.

13. A system for processing an electronic payment requested by a payor, comprising:
   a machine-readable medium storing processor-executable instructions;
   a secure server configured to authenticate electronic payment information received from the payor via a client device configured to be used by the payor, the secure server including at least one processor configured to execute the instructions stored on the machine-readable medium, the secure server and the client device each coupled to a communications network, the client device configured to send the electronic payment information to the secure server on the communications network via a secure access point, wherein the instructions, when executed by the processor, configure the secure server to:
   receive enrollment information from the client device via the communications network, the enrollment information relating to the payor and including authorization to process electronic transactions and endorse payments to partner financial institutions;
   receive electronic payment instructions from the client device via the communications network, the electronic payment instructions including payment data specified by the payor via the client device, the payment data including an amount of a payment and identifying at least one payee, the payment data further including a front image and a back image of a check acquired by the client device;
   execute an algorithm for assessing a risk of the electronic payment instructions based on past payments; and
   if the risk is determined to be within an acceptable level:
   composite the front image of a check from the received payment data;
   perform an endorsement of the check if required;
   composite the back image of the check including the endorsement;
   print the check including the front image and the back image;
   scan electronic images of front and back of the printed check;
   create check image pairs of the electronic images of the front and back of the printed check; and
   alter the check image pairs for protecting data on the check image pairs, including protecting at least a portion of an account number, a routing number of an account of the payor, or both the account number and routing number; and order an electronic deposit in the amount of the payment to the at least one payee using a financial institution partner.

14. The system of claim 13, wherein the client device includes one or more of a desktop computer, a mobile phone, or a laptop computer.

15. The system of claim 13, wherein the client device executes a browser-based program to communicate with the secure server.

16. The system of claim 13, wherein the client device executes an applet to communicate with the secure server.

17. The system of claim 13, wherein to assess a risk of the electronic payment instructions, the secure server is configured to determine if the electronic payment instructions include parameters associated with fraudulent transactions.

18. The system of claim 17, wherein the parameters associated with fraudulent transactions include a suspicious payee.

19. The system of claim 17, wherein the parameters associated with fraudulent transactions include an unusually large amount of payment.

* * * * *